United States Patent
Nakatsuka et al.

(10) Patent No.: US 12,459,850 B2
(45) Date of Patent: Nov. 4, 2025

(54) GLASS PRODUCTION METHOD

(71) Applicant: NIPPON ELECTRIC GLASS CO., LTD., Otsu (JP)

(72) Inventors: Kazuto Nakatsuka, Otsu (JP); Tsubasa Kagai, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 302 days.

(21) Appl. No.: 18/035,799

(22) PCT Filed: Nov. 10, 2021

(86) PCT No.: PCT/JP2021/041266
§ 371 (c)(1),
(2) Date: May 8, 2023

(87) PCT Pub. No.: WO2022/107650
PCT Pub. Date: May 27, 2022

(65) Prior Publication Data
US 2023/0406748 A1   Dec. 21, 2023

(30) Foreign Application Priority Data
Nov. 18, 2020   (JP) .................................. 2020-191564

(51) Int. Cl.
*C03B 19/02* (2006.01)
(52) U.S. Cl.
CPC .......... *C03B 19/02* (2013.01); *C03B 2201/86* (2013.01)

(58) Field of Classification Search
CPC .. C03B 19/02; C03B 2201/86; C03B 2201/88
See application file for complete search history.

(56) References Cited

U.S. PATENT DOCUMENTS

2004/0206119 A1   10/2004   Syllaios et al.
2008/0083249 A1    4/2008   Goto et al.
(Continued)

FOREIGN PATENT DOCUMENTS

| CN | 101096289 A | 1/2008 |
| CN | 101164933 A | 4/2008 |

(Continued)

OTHER PUBLICATIONS

JP06321561A Clarivate Analytics Machine Translation retrieved May 13, 2025. (Year: 2025).*

(Continued)

*Primary Examiner* — Lisa L Herring
(74) *Attorney, Agent, or Firm* — Keating & Bennett, LLP (57) ABSTRACT

Provided is a glass production method with which oxidation can be easily prevented and productivity can be increased. The glass production method includes a step of allowing a melt (11), which is obtained by melting a glass raw material, to flow into a mold (13) and a step of cooling the melt (11) to yield a glass (18). A partition member (16) is disposed in the mold (13), forming an inflow portion (17) surrounded by the mold (13) and the partition member (16). In the step of allowing the melt (11) to flow into the mold (13), the melt (11) flows into the inflow portion (17) while the mold (13) is moved relative to the partition member (16) to increase the capacity of the inflow portion (17).

3 Claims, 6 Drawing Sheets

(56) References Cited

U.S. PATENT DOCUMENTS

| | | | |
|---|---|---|---|
| 2018/0037491 A1* | 2/2018 | Hijiya | ................. C03C 4/082 |
| 2020/0148575 A1 | 5/2020 | Matsushita et al. | |

FOREIGN PATENT DOCUMENTS

| | | | | |
|---|---|---|---|---|
| CN | 103949591 A | 7/2014 | | |
| CN | 105693070 A | 6/2016 | | |
| CN | 108101347 A | 6/2018 | | |
| CN | 108726850 A | 11/2018 | | |
| FR | 2831158 A1 | 4/2003 | | |
| JP | 06-279040 A | 10/1994 | | |
| JP | 06321561 A | * 11/1994 | ............ | C03B 19/02 |
| JP | 2013-001586 A | 1/2013 | | |
| JP | 2015-209364 A | 11/2015 | | |

OTHER PUBLICATIONS

Official Communication issued in International Patent Application No. PCT/JP2021/041266, mailed on Feb. 1, 2022.

Official Communication issued in corresponding European Patent Application No. 21894524.4, mailed on Sep. 4, 2024, 7 pages.

Official Communication issued in corresponding Chinese Patent Application No. 202180077721.0, mailed on Feb. 25, 2025, 7 pages.

* cited by examiner (a)

GLASS PRODUCTION METHOD

TECHNICAL FIELD

The present invention relates to a glass production method.

BACKGROUND ART

In recent years, chalcogenide glass has been known as a material suitable for use in the field of infrared optics. Chalcogenide glass has infrared transmissivity and can be manufactured by press molding. For this reason, chalcogenide glass is good for mass production and cost reduction.

To produce an optical member such as a lens, for example, molten glass is cast by rapid solidification to form a glass ingot, which is then ground, polished, and cleaned to prepare a preform glass. Then, the preform glass is subjected to press molding or the like to prepare an optical member such as a lens.

Patent Document 1 below discloses an example of a production method of a glass article. In this production method, molten glass is poured into a bottomed cylindrical mold and subjected to casting, resulting in a glass ingot.

CITATION LIST

Patent Literature

Patent Document 1: JP 2015-209364 A

SUMMARY OF INVENTION

Technical Problem

Oxidation should be suppressed when forming a glass such as chalcogenide glass. However, in the method described in Patent Document 1, the melt that has flowed into the mold makes contact with air over an area equivalent to the area of the opening of the mold. Thus, a step of establishing an environment to perform molding in an inert atmosphere or the like is required to suppress oxidation. However, performing such a step makes it difficult to increase productivity.

An object of the present invention is to provide a glass production method with which oxidation can be easily prevented and productivity can be increased.

Solution to Problem

A glass production method according to an embodiment of the present invention includes allowing a melt, which is obtained by melting a glass raw material, to flow into a mold and cooling the melt to yield a glass, wherein: a partition member is disposed in the mold, forming an inflow portion surrounded by the mold and the partition member; and, in the step of allowing the melt to flow into the mold, the melt flows into the inflow portion while the mold is moved relative to the partition member to increase the capacity of the inflow portion.

In the step of allowing the melt to flow into the mold, a thickness of the melt is preferably kept constant when the mold is moved relative to the partition member.

In the step of allowing the melt to flow into the mold, preferably only the mold is moved.

The step of allowing the melt to flow into the mold is preferably performed in an air atmosphere.

The glass is preferably a chalcogenide glass.

Advantageous Effects of Invention

The present invention provides a glass production method with which oxidation can be easily prevented and productivity can be increased.

BRIEF DESCRIPTION OF DRAWINGS

FIG. 1(a) to FIG. 1(c) are schematic cross-sectional views illustrating steps up to a step of heating a raw material in a glass production method according to a first embodiment of the present invention.

FIG. 3(a) to FIG. 3(d) are schematic cross-sectional views illustrating a step of allowing the melt to flow into a mold in the glass production method according to the first embodiment of the present invention.

FIG. 4(a) to FIG. 4(d) are schematic cross-sectional views illustrating a glass production method of a reference example.

DESCRIPTION OF EMBODIMENTS

Preferred embodiments are described below. However, the following embodiments are merely examples, and the present invention is not limited to the following embodiments. Moreover, in the drawings, members having substantially the same functions may be given the same reference signs.

Glass Production Method

First Embodiment

The present embodiment includes a step of allowing a melt, which is obtained by melting a raw material, to flow into a mold. Hereinafter, the production method of the present embodiment will be described with reference to the drawings.

Figure 1:
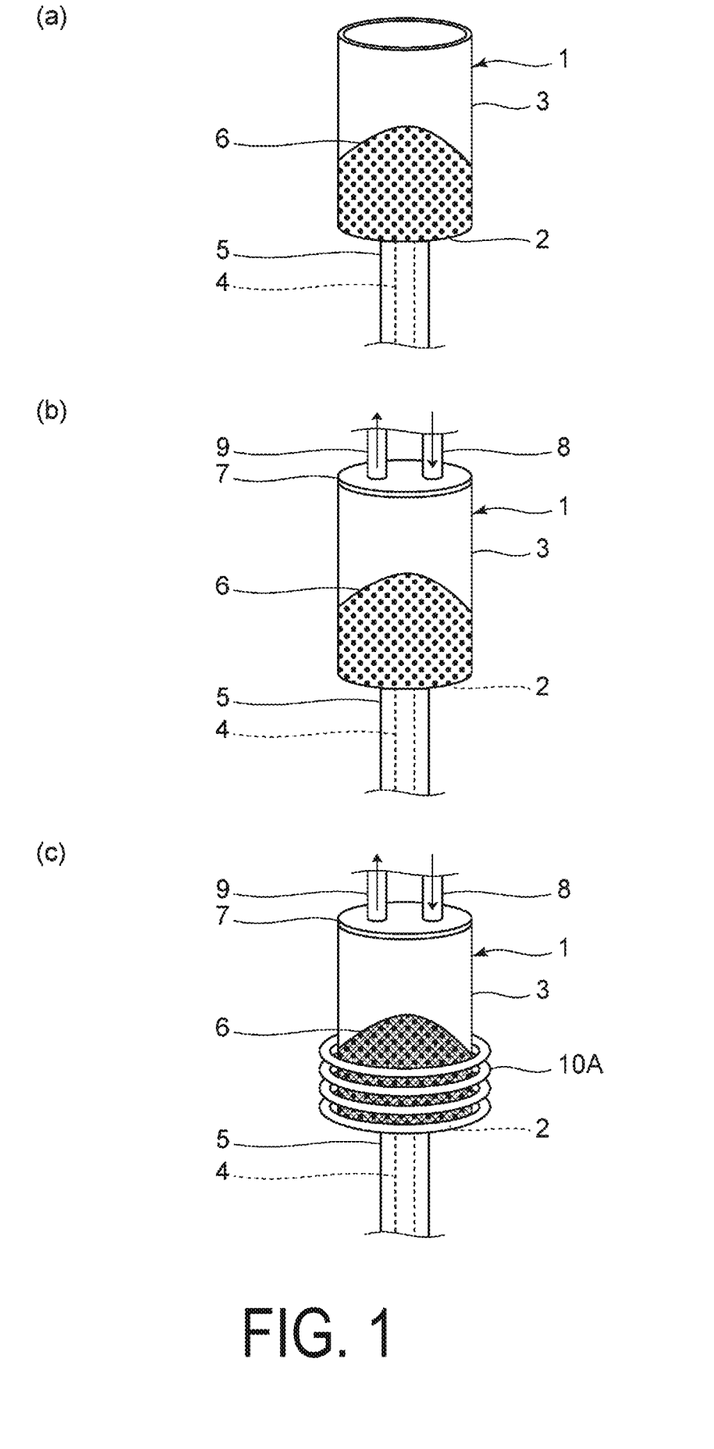
Figure 2:
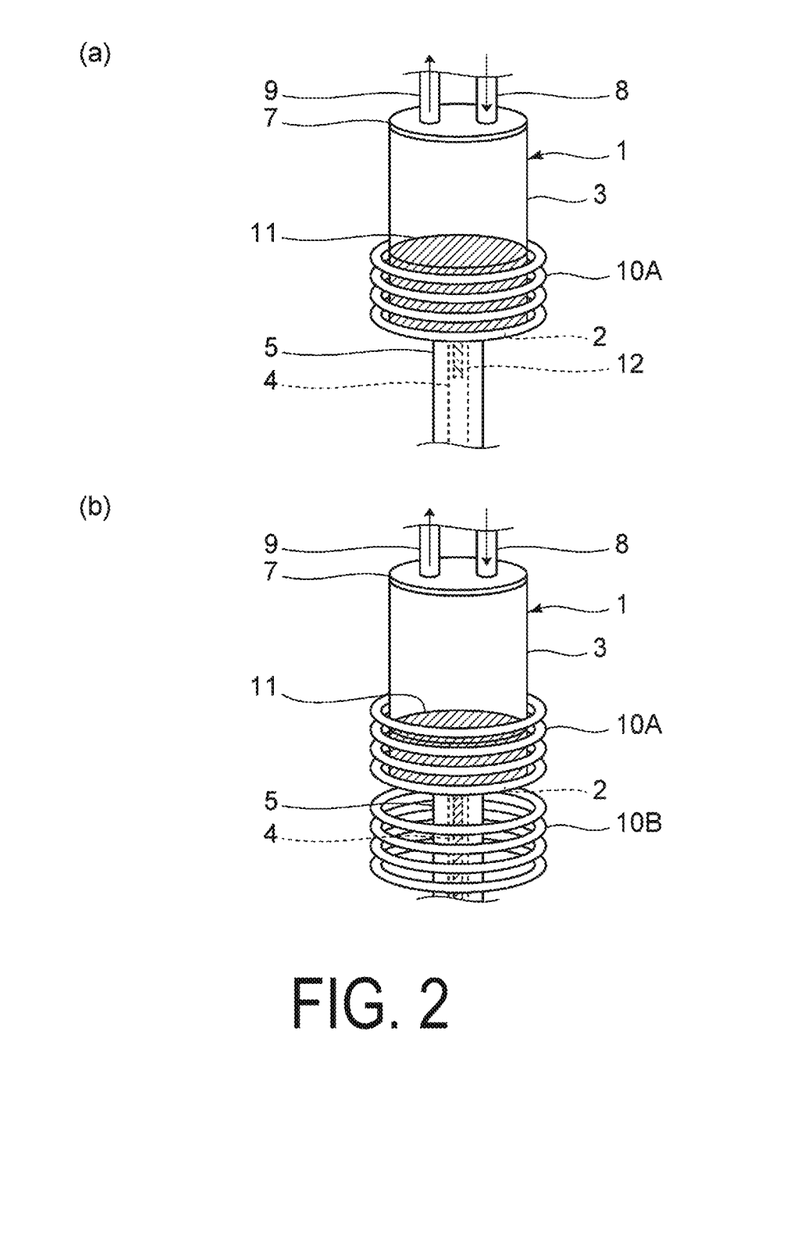
FIG. 2(a) and FIG. 2(b) are schematic cross-sectional views illustrating steps including and after a step of stirring a melt in the glass production method according to the first embodiment of the present invention.

FIG. 1(a) to FIG. 1(c) are schematic cross-sectional views illustrating steps up to a step of heating a raw material in a glass production method according to a first embodiment of the present invention. FIG. 2(a) and FIG. 2(b) are schematic cross-sectional views illustrating steps including and after a step of stirring a melt in the glass production method according to the first embodiment of the present invention. FIG. 3(a) to FIG. 3(d) are schematic cross-sectional views illustrating the step of allowing the melt to flow into the mold in the glass production method according to the first embodiment of the present invention. For convenience, a coil 10A or a coil 10B is omitted in some drawings.

As an example of the present invention, the production method of the present embodiment is a method of producing a chalcogenide glass. However, the method according to the present invention can also be applied to the production of other types of glass that are not chalcogenide glass.

As illustrated in FIG. 1(a), in the present embodiment, a crucible is used as a container 1. The container 1 has a bottom portion 2 and a side wall portion 3. The container 1 is preferably made of quartz glass. When the container 1 is made of quartz glass, glass can be suitably formed in the following steps.

A pipe 4 is connected to the bottom portion 2 of the container 1. A pipe sleeve 5 is disposed around the pipe 4. The pipe 4 extends through the inside of the pipe sleeve 5. In the present embodiment, the pipe sleeve 5 is made of Pt. However, the pipe sleeve 5 may be made of any suitable metal.

As illustrated in FIG. 1(a), a raw material 6 of glass is placed inside the container 1. In the present embodiment, the raw material 6 is a mixture containing a component constituting a chalcogenide glass. In the present embodiment, the raw material 6 may contain a metal. Note that in an embodiment of the present invention, "metal" includes metal elements, metalloid elements, alkali metal elements, and alkaline earth metal elements, etc. Details of the raw material 6 will be described below. Note that preferably, a small amount of the raw material 6 is melted in advance to form a small amount of a melt 11, and the small amount of the melt 11 is discharged into the pipe 4. The small amount of the melt 11 is cooled in the pipe 4, resulting in a solidified product (solid glass). In this way, a plug 12 can be formed. Because the plug 12 is formed, the raw material 6 can be disposed stably even when the pipe 4 is connected to the bottom portion 2 of the container 1.

Next, as illustrated in FIG. 1(b), a lid 7 is placed on the side wall portion 3 of the container 1. A gas supply pipe 8 and a gas discharge pipe 9 are connected to the lid 7. Gas inside the container 1 is discharged through the gas discharge pipe 9, reducing pressure inside the container 1. Next, an inert gas or a reducing gas is supplied into the container 1 from the gas supply pipe 8. This process is then repeated, rendering the inside of the container 1 into an inert atmosphere or a reducing atmosphere.

In forming a chalcogenide glass, it is necessary to prevent the heated raw material 6 from reacting with oxygen or moisture. In the present embodiment, since air inside the container 1 is replaced with an inert gas or a reducing gas, oxygen and moisture are removed from the container. Thus, a chalcogenide glass can be suitably formed without the use of a sealed container kept in a vacuum state. In the present embodiment, as described below, the formed glass can be discharged from the pipe 4 to outside of the container 1. Because of this, the container 1 does not need to be destroyed to remove the formed glass, and the container 1 can be reused.

Meanwhile, as illustrated in FIG. 1(c), the coil 10A is disposed surrounding at least a part of the side wall portion 3 of the container 1. Specifically, the coil 10A is disposed surrounding a part of the side wall portion 3 corresponding to where the raw material 6 is disposed in the container 1. An electric current is applied to the coil 10A, and the raw material 6 is induction-heated. Specifically, an electric current is applied to the coil 10A, generating an induced magnetic field which in turn generates an induced current. The raw material 6 contains a metal, which has an internal resistance. The induced current flowing into the metal causes the metal contained in the raw material 6 to become a heat source, heating the entire raw material 6. By this induction-heating, the raw material 6 is turned into the melt 11, as illustrated in FIG. 2(a).

The application of electric current to the coil 10A generates an induced magnetic field and an induced current, resulting in a Lorentz force being applied to the melt 11. The Lorentz force can stir the melt 11. As such, in the present embodiment, the melt 11 can be stirred without using a means, such as a stirrer, that stirs the melt 11 by bringing a member into direct contact with the melt 11. However, a stirrer or the like may be used to stir the melt 11.

As described above, some of the melt 11 is discharged into the pipe 4. The melt 11 in the pipe 4 is cooled and becomes a solidified product (solid glass). In this way, the plug 12 is formed. As such, a small amount of the melt 11 that corresponds to the plug 12 is discharged into the pipe 4, but the discharge of the rest of the melt 11 is stopped by the plug 12. However, a lid, a plunger, or the like may be used instead of the plug 12.

As illustrated in FIG. 2(b), the coil 10B is disposed around the pipe sleeve 5. An electric current is applied to the coil 10B, and the pipe sleeve 5 is induction-heated. The pipe 4 and the plug 12 in the pipe 4 are heated by radiant heat from the pipe sleeve 5. Note that the plug 12 is a solid glass and does not contain an elemental metal or an alloy, and thus is not susceptible to induction-heating. The above heating causes the plug 12 to melt, and the melt 11 is discharged from the container 1.

Note that, the methods illustrated in FIG. 1(a) to FIG. 1(c) as well as in FIG. 2(a) and FIG. 2(b) are examples, and the methods in the step of melting the raw material 6 and in the step of discharging the melt 11 are not limited to those described above.

As illustrated in FIG. 3(a), the discharged melt 11 flows into a mold 13. In the present embodiment, the mold 13 is a container having a cuboid shape. The mold 13 has a bottom portion 14 and a wall portion 15. In the mold 13, the side opposing the bottom portion 14 is open. A partition member 16 having a cuboid shape is disposed in the mold 13. Specifically, the partition member 16 is in contact with the bottom portion 14 and the wall portion 15 of the mold 13. This forms an inflow portion 17 surrounded by the bottom portion 14 and wall portion 15 of the mold 13 and the partition member 16. Note that, the wall portion 15 includes an opposing part 15a. The opposing part 15a constitutes the inflow portion 17 and opposes the partition member 16.

First, as illustrated in FIG. 3(a), the melt 11 flows into the inflow portion 17 until the melt 11 in the mold 13 reaches a given thickness (that is, a given liquid level). In FIG. 3(a), the thickness of the melt 11 is schematically illustrated as a thickness reaching the upper end of the wall portion but the given thickness of the melt 11 is not limited to the illustrated thickness. Note that, in the present embodiment, the step of allowing the melt 11 to flow into the mold 13 and a step of cooling the melt 11, which will be described later, are performed in an air atmosphere. In this case, the longer the contact time with the outside air, the more likely a heterogeneous layer 11a forms at the surface of the chalcogenide glass melt 11. The heterogeneous layer 11a includes an oxide impurity and/or a devitrified substance and/or a rapidly cooled and solidified glass.

Next, as illustrated in FIG. 3(b) and FIG. 3(c), the mold 13 is moved relative to the partition member 16 while the melt 11 flows into the mold 13. In this way, the melt 11 flows into the mold 13 while the capacity of the inflow portion 17 is being increased. Specifically, the mold 13 is slid while the partition member 16 stays in contact with the bottom portion 14 and the wall portion 15 of the mold 13. The mold 13 is moved in a direction in which the opposing part 15a of the wall portion 15 separates from the partition member 16. At this time, in the present embodiment, the partition member 16 and the pipe 4 are not moved, and only the mold 13 is moved. As a result, the area of the opening of the inflow portion 17 increases while the capacity of the inflow portion 17 increases.

Figure 3:
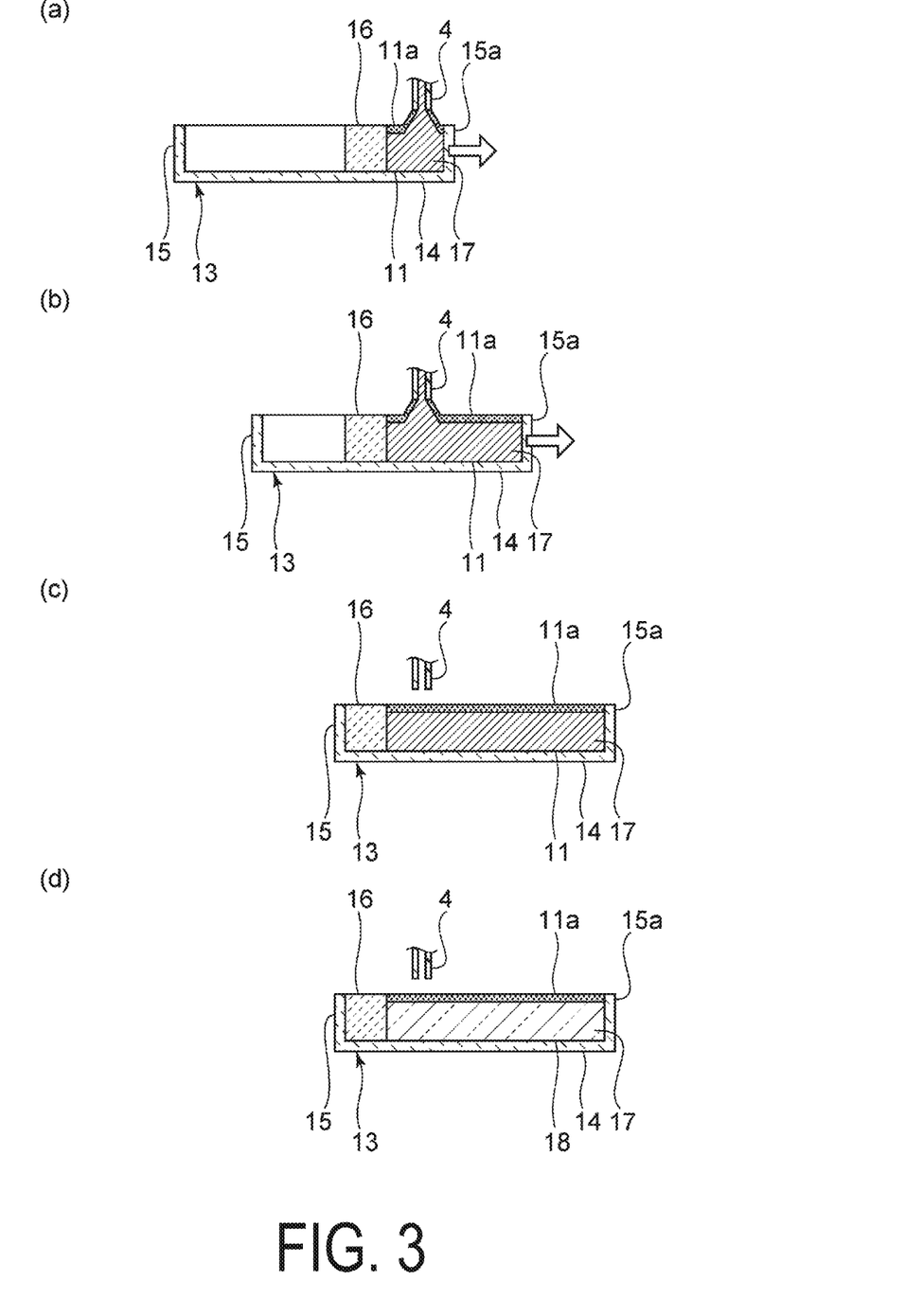

Next, as illustrated in FIG. 3(*d*), a glass 18 is formed by cooling the melt 11 in the mold 13. In the present embodiment, the resulting glass 18 has a prismatic shape. A preform glass can be prepared by grinding, polishing, and cleaning the glass 18. Then, the preform glass can be subjected to press molding or the like, so that an optical member such as a lens can be prepared. Note that, an optical member such as a lens may be directly produced from the glass 18 without preparing the preform glass. The heterogeneous layer 11*a* can be removed by, for example, grinding or polishing.

In the present embodiment, the melt 11 is allowed to flow into the mold 13 while the mold 13 is moved relative to the partition member 16 to increase the capacity of the inflow portion 17. As a result, oxidation of the melt 11 can be easily suppressed, and productivity of the glass 18 can be improved. Further, the occurrence of striae in the glass 18 can be suppressed. A detailed description of this is as follows.

When a melt flows into a known mold, the distance between a pipe and the liquid surface of the melt gradually decreases as the melt is being supplied. Despite of that, the melt is supplied while in contact with outside air for a long time. The melt supplied while being in contact with outside air for a long time contains a heterogeneous part, and the liquid surface is constantly replaced by such a melt. As such, the newly added melt containing a heterogeneous part and the previously supplied melt are constantly mixing with each other over an area equivalent to the area of the opening of the mold, and the glass melt is deposited in a non-homogeneous state.

In contrast, as illustrated in FIG. 3(*b*) and FIG. 3(*c*), in the present embodiment, the melt 11 flows into the inflow portion 17 until the melt 11 in the mold 13 reaches a given thickness, and then the melt 11 flows into the mold 13 while the capacity of the inflow portion 17 is being increased. When the melt 11 reaches a given thickness in the mold 13, the heterogeneous layer 11*a* forms at the liquid surface of the melt 11. As a result, the melt 11 that is allowed to flow into the inflow portion 17 while the capacity of the inflow portion 17 is being increased flows between the bottom portion 14 of the mold 13 and the heterogeneous layer 11*a* without being in contact with outside air for a long time. Note that, as the area of the opening of the inflow portion 17 increases, the area of the heterogeneous layer 11*a* also increases. Thus, even when the mold 13 is slid, the inflow portion 17 is covered by the heterogeneous layer 11*a*. Therefore, the heterogeneous layer 11*a* prevents the melt 11 newly introduced into the mold 13 from coming into contact with outside air. Thus, oxidation of the melt 11 is suppressed. Accordingly, productivity can be increased.

Further, according to the method of the present invention, the area where the melt 11 is in contact with outside air is not at the maximum from the beginning, and gradually increases as the mold 13 is moved relative to the partition member 16. As such, the integrated value of the area of the melt 11 that is in contact with outside air and the amount of time the melt 11 is in contact with outside air can be reduced. Therefore, oxidation can be easily suppressed without a step of setting up an inert atmosphere. Accordingly, productivity can be increased.

Hereinafter, the effect of suppressing the occurrence of striae in glass in the present embodiment will be described in detail.

Figure 4:
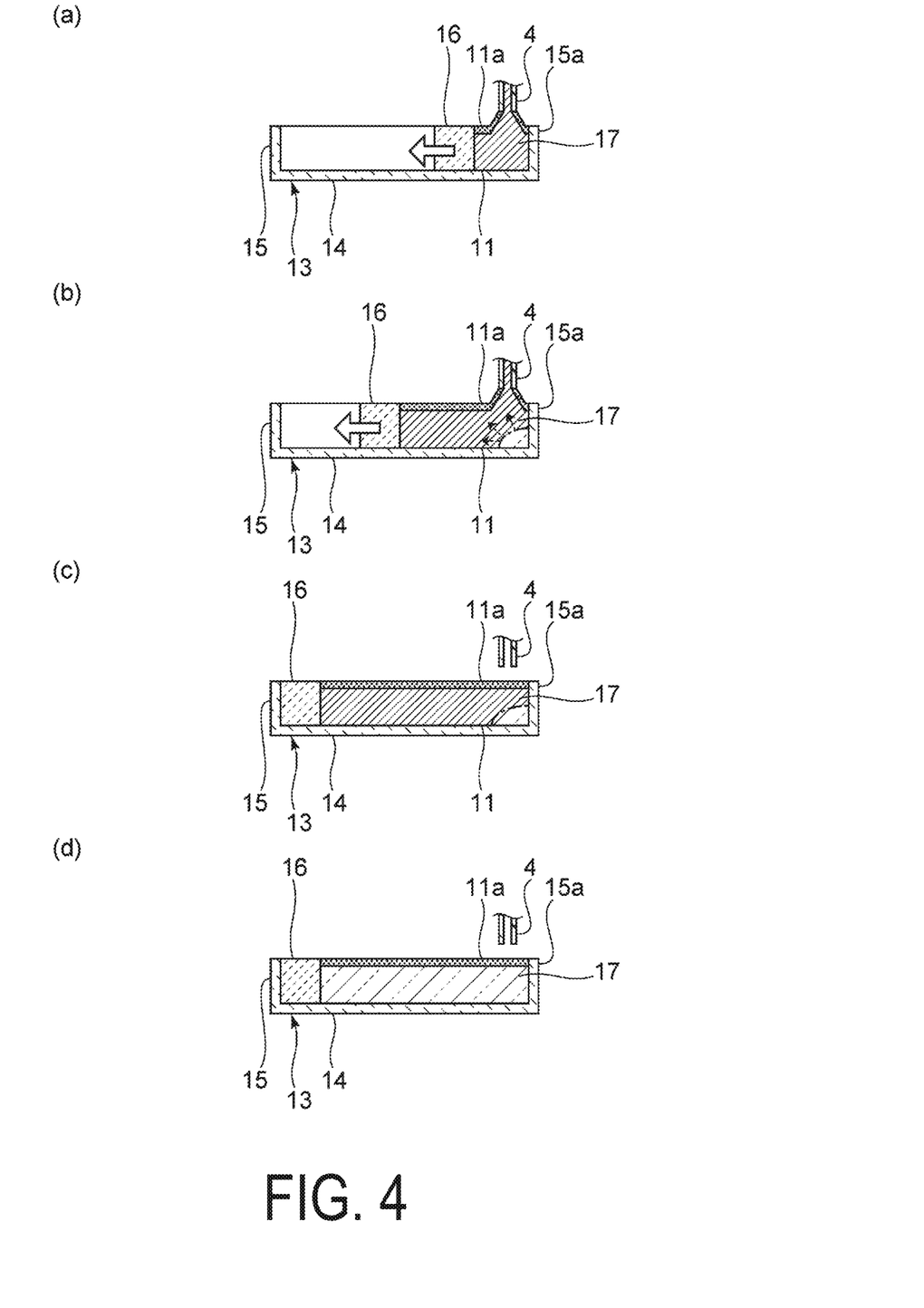

FIG. 4(*a*) to FIG. 4(*d*) are schematic cross-sectional views illustrating a glass production method of a reference example. In the reference example, as illustrated in FIG. 4(*a*), the melt 11 flows into the inflow portion 17. Next, as illustrated in FIG. 4(*b*) and FIG. 4(*c*), the melt 11 flows into the mold 13 while the partition member 16 is moved to increase the capacity of the inflow portion 17. At this time, the melt 11 cools relatively easily where it is in contact with the opposing part 15*a* of the mold 13. As such, as illustrated in FIG. 4(*b*), the melt 11 that has previously flowed into the inflow portion 17 cools and solidifies where it is in contact with the opposing part 15*a*, and after the solidification, the high-temperature melt 11 continues to be supplied from the pipe 4 to the vicinity of the solidified part. Therefore, some of the solidified part is melted by the high-temperature melt 11. Further, as indicated by the dashed line arrow in FIG. 4(*b*), the melted solidified part turns into a liquid, which then mixes with the supplied melt 11. Therefore, the melt 11 tends to be non-homogeneous. Further, as illustrated in FIG. 4(*d*), the melt 11 as described above cools and forms the glass 18, and thus striae tends to occur.

Meanwhile, in the present embodiment as illustrated in FIG. 3(*a*) to FIG. 3(*d*), the mold 13 is moved. At this time, since the relative position between the bottom portion 14 and the partition member 16 changes in the vicinity of the partition member 16, the melt 11 tends not to solidify immediately in the vicinity of the partition member 16.

Meanwhile, the melt 11 solidifies relatively easily where it is in contact with the opposing part 15*a* of the mold 13. Here, in the present embodiment, the opposing part 15*a* is moved away from the partition member 16 and the pipe 4. As such, when the melt 11 that has previously flowed into the inflow portion 17 cools and solidifies, the opposing part 15*a* is away from the pipe 4. Therefore, the high-temperature melt 11 is less likely to come into contact with the solidified part of the melt 11. Thus, part of the solidified part of the melt 11 is less likely to melt, as is the case described in the reference example, and the melt 11 is less likely to become non-homogeneous. As a result, the occurrence of striae in the glass 18 can be suppressed.

In the step of allowing the melt 11 to flow into the mold 13, the thickness of the melt 11 is preferably kept constant. In this way, the distance between the tip of the pipe 4 and the surface of the melt 11 can be kept small, and the supplied melt 11 can be prevented from coming into excessive contact with outside air. Thereby, oxidation of the melt 11 can be suppressed effectively.

When the melt 11 flows into the mold 13, preferably only the mold 13 is moved as is the case in the present embodiment. In other words, the partition member 16 is preferably not moved in the step of allowing the melt 11 to flow into the mold 13. This makes it easier to keep the thickness of the melt 11 constant. As such, solidification of the melt 11 in the vicinity of the pipe 4 can be more reliably suppressed, and melting of the solidified part can be more reliably suppressed. As a result, the occurrence of striae in the glass 18 can be more reliably suppressed.

Alternatively, the melt 11 may flow into the mold 13 in the following manner. The bottom portion 14 of the mold 13 is brought close to the pipe 4, and the melt 11 starts to flow into the mold 13. Then, the melt 11 continues to flow into the mold 13 while the mold 13 is moved away from the pipe 4. After the melt 11 reaches a given thickness in the mold 13, the melt 11 may flow into the mold 13 while the mold 13 is slid as described above. In this way, the melt 11 can be further prevented from contacting with outside air. The above procedure is particularly preferable when the inflow portion 17 has a large thickness.

The proportion of the materials contained in the raw material 6 of the present embodiment is adjusted to yield the resulting glass 18 the following composition. In the description of the composition of the glass 18, "%" means "mol %". Note that, for example, the sum of the contents of A, B, and C may be referred to as "content of A+B+C" or "A+B+C".

The glass 18 formed according to the method of the present embodiment contains, in terms of mol ratio, greater than 0% and 50% or less of Ge, greater than 0% and 50% or less of Ga, from % to 90% of Te, greater than 0% and 40% or less of Ag+Al+Ti+Cu+In+Sn+Bi+Cr+Zn+Mn, and from 0% to 50% of F+Cl+Br+I in the glass composition.

Ge is a component for forming a glass network. Ge is also a metalloid element. The content of Ge is greater than 0% and 50% or less, preferably from 2% to 40%, more preferably from 4% to 35%, even more preferably from 5% to 30%, further more preferably from 7% to 25%, and still more preferably from 10% to 20%. When the content of Ge is too small, vitrification becomes difficult. Meanwhile, when the content of Ge is too large, Ge-based crystal is easy to precipitate, and raw material costs tend to be high.

Ga is a component for increasing thermal stability (stability of vitrification) of glass. Ga is also a metal element. The content of Ga is greater than 0% and 50% or less, preferably from 1% to 45%, more preferably from 2% to 40%, even more preferably from 4% to 30%, further more preferably from 5% to 25%, and still more preferably from 10% to 20%. When the content of Ga is too small, vitrification becomes difficult. Meanwhile, when the content of Ga is too large, Ga-based crystal is easy to precipitate, and raw material costs tend to be high.

Te, which is a chalcogen element, is a component essential for forming a glass network. Te is also a metalloid element. The content of Te is from 30% to 90%, preferably from 40% to 89%, more preferably from 50% to 88%, even more preferably from 60% to 86%, and further more preferably from 70% to 85%. When the content of Te is too small, vitrification becomes difficult. Meanwhile, when the content of Te is too large, Te-based crystal is easy to precipitate.

Ag+Al+Ti+Cu+In+Sn+Bi+Cr+Zn+Mn are metal elements. When a glass contains the above metal elements, the glass can have higher thermal stability. The content of Ag+Al+Ti+Cu+In+Sn+Bi+Cr+Zn+Mn is from 0% to 40%, preferably greater than 0% and 30% or less, more preferably greater than 0% and 20% or less, and even more preferably from 0.1% to 10%. When the content of Ag+Al+Ti+Cu+In+Sn+Bi+Cr+Zn+Mn is too small or too large, vitrification becomes difficult. Note that the individual content of each of Ag+Al+Ti+Cu+In+Sn+Bi+Cr+Zn+Mn is from 0% to 40%, preferably from 0% to 30% (with at least one component being greater than 0%), more preferably from 0% to 20% (with at least one component being greater than 0%), and even more preferably from 0.1% to 10%. Of these, it is preferable to use Ag and/or Sn because Ag and Sn are particularly effective in increasing the thermal stability of glass.

In addition to the above components, the glass formed in the present embodiment may contain, for example, the following components.

F, Cl, Br, and I are also components that increase the thermal stability of glass. The content of F+Cl+Br+I is from 0% to 50%, preferably from 1% to 40%, more preferably from 1% to 30%, even more preferably from 1% to 25%, and particularly preferably from 1% to 20%. When the content of F+Cl+Br+I is too large, vitrification becomes difficult, and weather resistance tends to be weak. Note that the individual content of each of F, Cl, Br, and I is from 0% to 50%, preferably from 1% to 40%, more preferably from 1% to 30%, even more preferably from 1% to 25%, and particularly preferably from 1% to 20%. Of these, it is preferable to use I because the element raw material can be used and the effect of increasing glass stability is particularly great.

The inclusion of Si, Sb, and Cs results in an increased thermal stability. Here, Si and Sb are metalloid elements. Si+Sb+Cs is preferably from 0% to 40%, more preferably from 0% to 30%, even more preferably from 0% to 20%, and further more preferably from 0.1% to 10%.

S is a component that widens the vitrification range and tends to improve the thermal stability of glass. The content of S is preferably from 0% to 30%, more preferably from 0% to 20%, even more preferably from 0% to 10%, and particularly preferably from 0% to 3%. When the content of S is too large, transmittance of infrared rays having a wavelength of 10 μm or greater tends to be small.

Se and As are components that widen the vitrification range and improve the thermal stability of glass. The individual content of each of Se and As is preferably from 0% to 10%, more preferably from 0.5% to 5%. However, since these substances are toxic, the glass is preferably substantially free of Se and As from the viewpoint of reducing the effects on the environment and the human body, as described above.

Note that the glass is preferably substantially free of Cd, Tl, and Pb, which are toxic substances. Here, "substantially free" means a content of 0.1% or less.

A proportion of the metal in the raw material 6 is, in terms of vol %, preferably 80% or greater, more preferably 85% or greater, and particularly preferably 90% or greater. With such a configuration, the raw material 6 can be easily melted by induction-heating. As such, the temperature can be increased or decreased more easily and faster than when using radiation heating, and productivity can be increased. An upper limit of the proportion of the metal in the raw material 6 is not limited and may be, for example, 100%, 99%, and particularly 98% or less.

Second Embodiment

Figure 5:
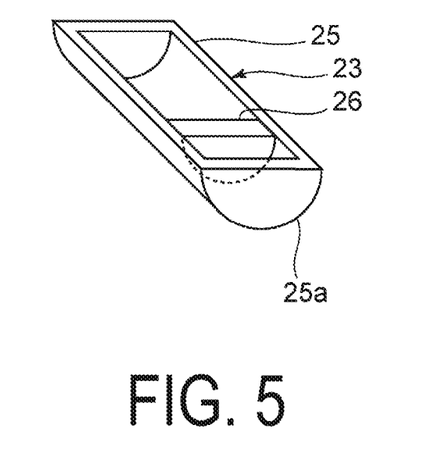
FIG. 5 is a schematic perspective view of a mold used in a glass production method according to a second embodiment of the present invention.

FIG. 5 is a schematic perspective view of a mold used in a glass production method according to a second embodiment. The present embodiment is different from the first embodiment in that a mold 23 has a semi-cylindrical shape. In the present embodiment, glass is formed in the same manner as in the first embodiment.

The mold 23 has a wall portion 25. The wall portion 25 includes a part that is the curved surface of the semi-cylindrical shape and a part that is a pair of semicircular surfaces. A partition member 26 having a semi-cylindrical shape is disposed in the mold 23. The partition member 26 is in contact with the wall portion 25 of the mold 23. In the wall portion 25, one of the pair of semi-circular surfaces serving as one of the sides is an opposing part 25a. The mold 23 may be supported by a guide rail, an appropriate support, or the like. Note that, the shape of the mold is not limited to the shapes in the first embodiment and the present embodiment.

Similar to in the first embodiment, oxidation of the melt 11 in the present embodiment can be easily suppressed, and productivity of glass can be improved. Further, the occurrence of striae in the glass can be suppressed. In the present embodiment, the resulting glass has a columnar shape with a semicircular bottom. Further, a preform glass can be prepared by grinding, polishing, and cleaning the glass. Then, the preform glass can be subjected to press molding or the like, so that an optical member such as a lens can be prepared.

Third Embodiment

Figure 6:
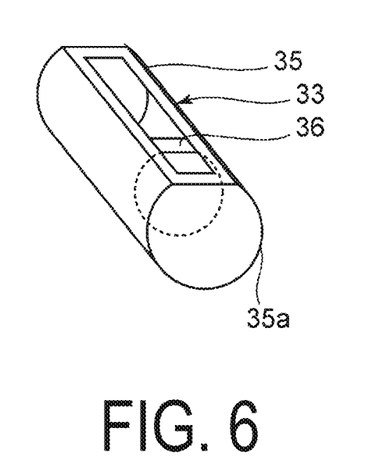
FIG. 6 is a schematic perspective view of a mold used in a glass production method according to a third embodiment of the present invention.

FIG. 6 is a schematic perspective view of a mold used in a glass production method according to a third embodiment. The present embodiment is different from the first embodiment in that a mold 33 has a substantially cylindrical shape. In the present embodiment, glass is formed in the same manner as in the first embodiment.

The mold 33 has a wall portion 35. The wall portion 35 includes a part that is the curved surface of the substantially cylindrical shape and a part that is a pair of substantially circular surfaces. A partition member 36 having a substantially cylindrical shape is disposed in the mold 33. The partition member 36 is in contact with the wall portion 35 of the mold 33. In the wall portion one of the pair of substantially circular surfaces serving as one of the sides is an opposing part The mold 33 may be supported by a guide rail, an appropriate support, or the like. Note that, the shape of the mold is not limited to the shapes in the first embodiment and the present embodiment.

Similar to in the first embodiment, oxidation of the melt 11 in the present embodiment can be easily suppressed, and productivity of glass can be improved. Further, the occurrence of striae in the glass can also be suppressed. In the present embodiment, the resulting glass has a substantially cylindrical shape. Further, a preform glass can be prepared by grinding, polishing, and cleaning the glass. Then, the preform glass can be subjected to press molding or the like, so that an optical member such as a lens can be prepared. Since the planar shape of an optical member such as a lens is often circular, forming the substantially cylindrical glass according to the present embodiment can reduce the processing required for lens production and improve yield.

REFERENCE SIGNS LIST

1 Container
2 Bottom portion
3 Side wall portion
4 Pipe
5 Pipe sleeve
6 Raw material
7 Lid
8 Gas supply pipe
9 Gas discharge pipe
10A Coil
10B Coil
11 Melt
11a Heterogeneous layer
12 Plug
13 Mold
14 Bottom portion
15 Wall portion
15a Opposing part
16 Partition member
17 Inflow portion
18 Glass
23 Mold
25 Wall portion
25a Opposing part
26 Partition member
33 Mold
35 Wall portion
35a Opposing part
36 Partition member

The invention claimed is:

1. A glass production method comprising:
a step of allowing a melt, which is obtained by melting a glass raw material, to flow into a mold; and
a step of cooling the melt to yield a glass, wherein
the glass is a chalcogenide glass,
a partition member is disposed in the mold, forming an inflow portion surrounded by the mold and the partition member,
the step of allowing the melt to flow into the mold is performed in an air atmosphere, and
in the step of allowing the melt to flow into the mold, and while a heterogeneous layer is allowed to form on a liquid surface of the melt flowing into the inflow portion and the mold is moved relative to the partition member to increase the capacity of the inflow portion, the melt flows between a bottom portion of the inflow portion and the heterogeneous layer.

2. The glass production method according to claim 1, wherein a thickness of the melt is kept constant when the mold is moved relative to the partition member in the step of allowing the melt to flow into the mold.

3. The glass production method according to claim 1, wherein only the mold is moved in the step of allowing the melt to flow into the mold.

* * * * *